3,218,927
HATCH REMOVER
Albert M. Stott, Southampton, Pa., assignor to the United States of America as represented by the Secretary of the Army
Filed Oct. 1, 1963, Ser. No. 313,131
4 Claims. (Cl. 89—1)
(Granted under Title 35, U.S. Code (1952), sec. 266)

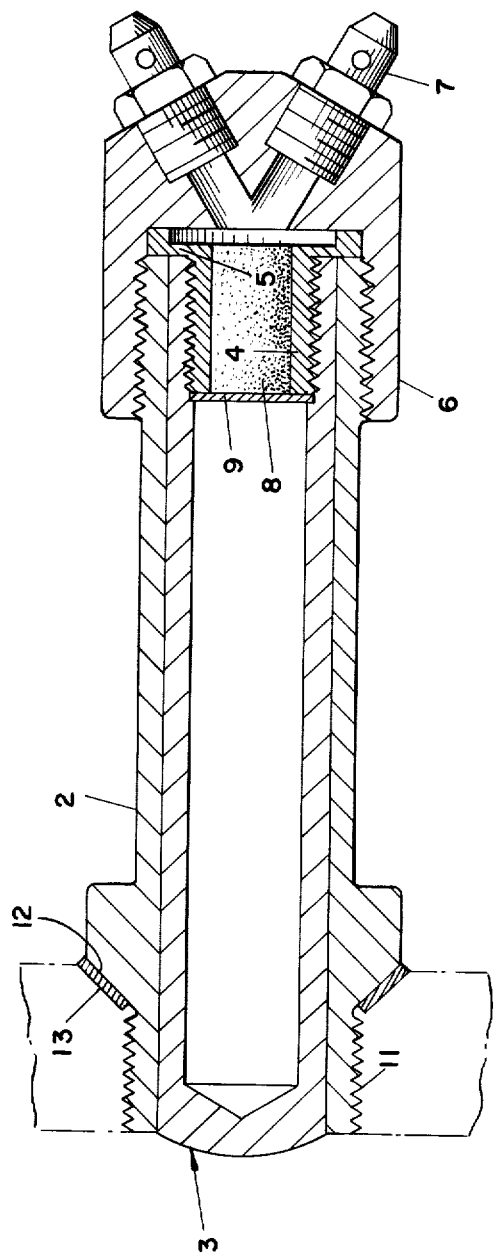

The invention described herein may be manufactured and used by or for the Government for governmental purposes without the payment to me of any royalty thereon.

This invention relates to hatch removers and more particularly to removers utilizing two-tube construction in combination with a multi-purpose element for storing propellant, locking the device prior to firing, and for effecting a seal subsequent to firing.

Prior devices for accomplishing similar results have been complex and burdensome. In most cases, the size has been greater due to the need for 3-tube devices.

The present invention is based on the use of a simple compact two-tube construction to yield the output of comparable three-tube devices, and obviates the necessity for separate cartridge cases, seals and special locking devices, by using a multipurpose propellant container.

It is an object of this invention to provide a compact hatch remover admitting of simple construction.

It is a further object to provide a hatch remover whose shortness in length is not accompanied by a shortening in the length of the stroke.

Other objects and many of the attendant advantages of this invention will be readily appreciated as the same becomes better understood by reference to the following detained description of a preferred embodiment of the invention as illustrated in the accompanying sheet of drawing in which the single figure is a sectional view of said preferred embodiment.

In the embodiment illustrated, there is provided a cylinder 2 which houses hollow piston 3. The inside end of piston 3 is internally threaded to receive a threaded propellant container 4 having a shearable lip 5 extending over the adjacent ends of the cylinder 2 and piston 3. Head 6 is threaded on cylinder 2 over lip 5 securing the piston to the cylinder, and contains igniters 7 which cooperate with the propellant 8 held captive in the contained by means of disc 9 which is sealed thereto.

The cylinder is preferably provided with a threaded end 11 for mounting purposes, in combination with a tapered shoulder 12 and a soft metal gasket 13 such as copper. The gasket is capable of plastically deforming upon tightening of the threads to permit proper orientation of the ignition elements.

The thickness of shearable lip 5 is determined by the circumference of said lip at the point of shear, the lip metal, and the force at which the shearing action is to occur:

Example, if the lip metal if known to shear at 40,000 p.s.i., and if shear is to occur at 2,000 pound, and if the circumference of this line of shear is 2.75 inches, the thickness of the lip is calculated as follows:

$$\text{Shear area} = \frac{2{,}000 \text{ pounds}}{40{,}000 \text{ pounds/inch}^2} = 0.05 \text{ square inch}$$

$$\text{Thickness} = \frac{\text{Shear area}}{\text{Circumference}} = \frac{0.05 \text{ in.}^2}{2.75 \text{ in.}}$$

$$\text{Thickness} = 0.0182 \text{ inch}$$

The igniters are preferably dual bridge electrical ignition elements, and may incorporate ignition powder therein. Alternatively, a disk of ignition powder may be inserted in the inner end of propellant container 4.

The quantity of propellant required will depend upon the work expected of the device.

In operation, electrical energy is supplied to the redundant electrical ignition elements which fire and ignite propellant 8 in the propellant container. The burning propellant bursts the disc 9 and gas fills hollow piston 3 exerting a force on the piston which builds until lip 5 on the propellant container shears. The piston is then free to move out of cylinder 2 while the remaining portion of lip 5 slides along the inside of cylinder 2 providing a seal.

High reliability is achieved because only one of the many bridge wires provided need function to ignite the propellant charge. Further, the dual circuits of the system are independent of the structure because they are not grounded thereto.

I claim:
1. A remover comprising
   a pair of telescoping tubes,
   a propellant container internally threaded to an end of an inner tube and having a shearable lip portion overlapping said end and an end of an outer tube, and
   head means fixed to said outer tube end clamping said lip portion thereto and containing ignition means cooperating with said propellant container.
2. A remover comprising
   a cylindrical body;
   a piston slidable therein and having an open end;
   a cylindrical propellant container fixed within said open end and equipped with a shearable lip portion in contact with and overlapping said open end;
   a head fixed to an end of said cylindrical body and clamping an overlapping portion of said lip to said cylindrical body end; and
   ignition means contained in said head for firing said cylindrical propellant container.
3. In a hatch remover, the combination of
   a cylinder;
   a hollow piston closed at one end;
   a propellant container threaded into another end of said piston and having a shearable extension overlapping and abutting the end of said cylinder when said piston is retracted thereinto;
   a head threaded onto said cylinder and clamping said extension against the end thereof, and
   a multiplicity of ignition elements situate in said head for firing said propellant container, whereby said extension is caused to shear and said piston is caused to move out of said cylinder.
4. The remover of claim 3 further characterized by said ignition means including a plurality of dual bridge electrical ignition elements and a quantity of ignition powder.

No references cited.

SAMUEL LEVINE, *Primary Examiner.*